(12) United States Patent
Acharya et al.

(10) Patent No.: US 10,853,833 B2
(45) Date of Patent: Dec. 1, 2020

(54) SYSTEM AND METHOD FOR SPECIAL EVENT HIGH VOLUME COMMERCE EXPERIENCE AND DEALS MANAGEMENT

(71) Applicant: Dell Products, LP, Round Rock, TX (US)

(72) Inventors: Harsh N. Acharya, Round Rock, TX (US); Rajesh B. Kaimal, Round Rock, TX (US); Matthew Hinze, Austin, TX (US); Parth Narendra Acharya, Austin, TX (US); David M. Gardner, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 790 days.

(21) Appl. No.: 15/007,749

(22) Filed: Jan. 27, 2016

(65) Prior Publication Data

US 2017/0213230 A1 Jul. 27, 2017

(51) Int. Cl.
*G06Q 30/02* (2012.01)

(52) U.S. Cl.
CPC ..... *G06Q 30/0207* (2013.01); *G06Q 30/0222* (2013.01)

(58) Field of Classification Search
CPC .................................................. G06Q 30/0222
See application file for complete search history.

(56) References Cited

U.S. PATENT DOCUMENTS

| 7,660,747 B2 | 2/2010 | Brice et al. | |
|---|---|---|---|
| 10,055,722 B1* | 8/2018 | Chen | G06Q 20/202 |
| 10,540,693 B1* | 1/2020 | Monsowitz | G06Q 30/0269 |
| 2007/0245351 A1* | 10/2007 | Sussman | G06Q 30/0603 718/104 |
| 2011/0307389 A1* | 12/2011 | Francia | G06Q 20/12 705/67 |
| 2012/0209686 A1* | 8/2012 | Horowitz | H04W 4/21 705/14.26 |

(Continued)

OTHER PUBLICATIONS

Queue-It. "Queue Online Customers and End-users". [archived on Aug. 15, 2015] [retrieved from internet archive on Jul. 30, 2020] <URL:https://web.archive.org/web/20150818213251/https://queue-it.com/product/> (Year: 2015).*

*Primary Examiner* — Michael W Schmucker
*Assistant Examiner* — Bion A Shelden
(74) *Attorney, Agent, or Firm* — Larson Newman, LLP

(57) ABSTRACT

An information handling system includes a first processor that provides a shopping system and a second processor that provides a purchasing system. The shopping system includes a deal page that displays a coupon associated with a product and that receives a request to purchase the product from a purchaser, wherein the coupon provides a deal to the purchaser for the purchase of the product, and wherein the coupon is provided based upon a limit, and a coupon allocator that allocates the coupon to the purchaser in response to the request, and in further response to a first determination that the limit is not exceeded. The purchasing system includes a purchase page that displays a purchase of the product by the purchaser in response to the request, and a coupon redeemer that redeems the coupon for the product in response to a second determination that the limit is not exceeded.

16 Claims, 3 Drawing Sheets

(56) References Cited

U.S. PATENT DOCUMENTS

| | | | | |
|---|---|---|---|---|
| 2013/0005438 A1* | 1/2013 | Ocko | ............... | H04W 4/21 463/25 |
| 2013/0041740 A1* | 2/2013 | Tyler | ............... | G06Q 30/02 705/14.35 |
| 2013/0166421 A1* | 6/2013 | Gudmundsson | ....... | G06Q 30/04 705/30 |
| 2013/0211897 A1* | 8/2013 | Jaschke | ............ | G06Q 30/0267 705/14.22 |
| 2013/0254007 A1* | 9/2013 | Cockcroft | ........... | G06Q 30/02 705/14.25 |
| 2013/0311255 A1* | 11/2013 | Cummins | ......... | G06Q 30/0235 705/14.13 |
| 2013/0332258 A1* | 12/2013 | Shiffert | ............. | G06Q 30/02 705/14.39 |
| 2014/0025459 A1* | 1/2014 | Donlan | ............ | G06Q 30/0222 705/14.23 |
| 2014/0047101 A1 | 2/2014 | Nix et al. | | |
| 2014/0236836 A1* | 8/2014 | Salonen | ............ | G06Q 20/3255 705/67 |
| 2014/0297382 A1* | 10/2014 | Chiussi | ............. | G06Q 30/0225 705/14.26 |
| 2014/0297392 A1* | 10/2014 | Moffitt | ............. | G06Q 30/0238 705/14.38 |
| 2015/0051964 A1* | 2/2015 | Hunt | ................. | G06Q 30/0261 705/14.39 |
| 2015/0088697 A1* | 3/2015 | Garnepudi | ........ | G06Q 30/0637 705/26.82 |
| 2015/0120422 A1* | 4/2015 | Deshpande | ....... | G06Q 30/0224 705/14.25 |
| 2015/0302456 A1* | 10/2015 | Rego | ................. | G06Q 30/0235 705/14.35 |
| 2016/0027056 A1* | 1/2016 | Taslimi | ............. | G06F 17/3087 705/14.45 |
| 2016/0086216 A1* | 3/2016 | Goldberg | .......... | G06Q 30/0251 705/14.49 |
| 2016/0247182 A1* | 8/2016 | Peterson | ........... | G06Q 30/0222 |
| 2017/0317935 A1* | 11/2017 | Murthy | ............ | H04L 47/19 |

* cited by examiner

… (1)

SYSTEM AND METHOD FOR SPECIAL EVENT HIGH VOLUME COMMERCE EXPERIENCE AND DEALS MANAGEMENT

FIELD OF THE DISCLOSURE

This disclosure generally relates to information handling systems, and more particularly relates to a system and method for special event high volume commerce experience and deals management.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
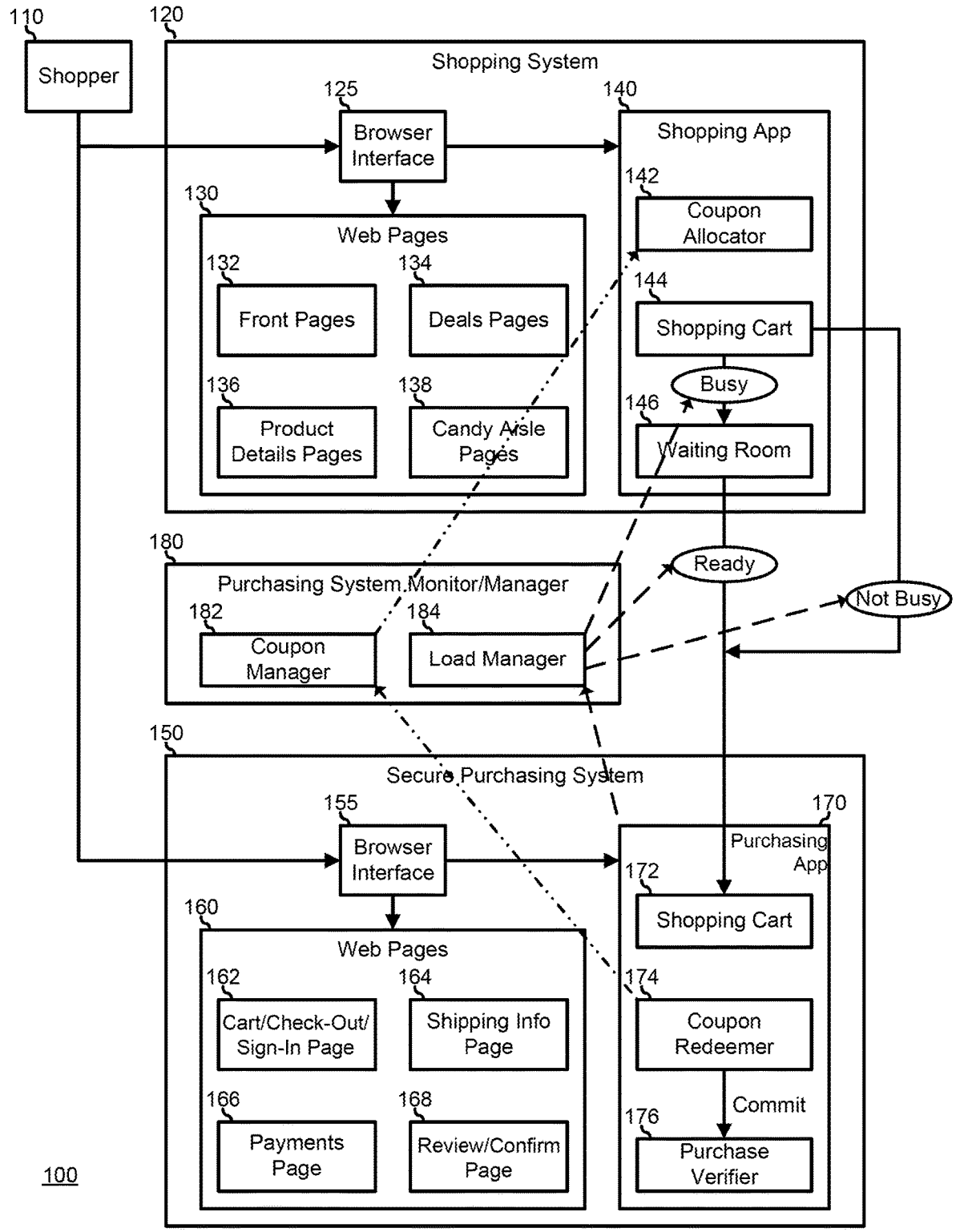
FIG. 1 is a diagramatic view of an electronic-commerce system according to an embodiment of the present disclosure.

FIG. 1 illustrates an embodiment of an electronic commerce (e-commerce) system 100. The e-commerce system can be implemented on one or more information handling system that for the purpose of this disclosure can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

E-commerce system 100 represents a network based system for a purchaser to search for products, view details and specifications for the products, make decisions to purchase and receive the products, to receive order information for the purchases, including shipping and payment information, and the like. As used herein, products can include any item that is offered for sale, lease, loan or that is otherwise transferred from an entity that provides e-commerce system 100 to a purchaser. Products can include tangible items such as materials, manufactured items, and the like, intangible items such as services and the like, or a combination of tangible and intangible items. E-commerce system 100 includes a shopper 110, a shopping system 120, a secure purchasing system 150, and a purchasing system monitor/manager 180. Shopper 110 represents a network connected information handling system used by a purchaser to access e-commerce system 100. Shopper 110 can be connected to e-commerce system 100 via a public network, a private network, or a combination thereof. In a particular embodiment, shopper 100 includes a web based browser and shopping system 120 and secure purchasing system 160 are accessible to the shopper via respective browser interfaces 125 and 155, as described below. In a particular embodiment, the web based network includes the Internet, a private internet, another network, or the like.

Shopping system 120 represents one or more information handling systems, or a portion thereof, that are provided to permit the purchaser to search for the products that are offered on e-commerce system 100, to view the details and specifications for the products, and to initiate purchases of the products. In a particular embodiment, shopping system 120 provides a publicly accessible shopping space that is not restricted as to the accessibility to the purchaser to shop on the shopping system. In another embodiment, shopping system 120 represents a secure website that is restricted as to the accessibility to the purchaser to shop on the shopping system, and that may require that the purchaser provide authentication credentials in order to validate the purchaser's privilege to shop on the shopping system. In addition, the communication between shopper 110 and browser interface 125 can be open, such as communications via a HyperText Transfer Protocol (HTTP) website, or the communication can be secured, such as communications via a Secure HTTP (HTTPS) website.

Shopping system 120 includes browser interface 125, web pages 130, and shopping applications 140. Web pages 130 represent the content of shopping system 120, as developed by the entity that provides e-commerce system 100, for the purpose of permitting the purchaser to search for products, to view the details and specifications for the products, and to initiate purchases of the products. As illustrated, web pages 130 includes front pages 132, deals pages 134, product details pages 136, and candy aisle pages 138. Front pages 132 represent one or more landing pages for e-commerce system 100 that provide the purchaser with multiple options for proceeding with the shopping experience, such as for browsing by product type, for searching for various products or features, for viewing advertising content, for obtaining product support, or the like. The landing pages can be focused on various product distinctions, such as where a first landing page is associated with home computing, and a second landing page is associated with business computing.

Deals page 134 represent custom content that is provided to highlight various promotional activities that are available on the products, such as stand-alone deals (such as product available at this price), door-buster deals (such as only three available at this price), package deals (such as purchase product A with product B for this price), or other deals, as needed or required. In a particular embodiment, one or more deals represented on deals pages 134 are implemented by providing a coupon for purchasing a product at the deal price. In a particular embodiment, the coupon is provided to the purchaser, such as where the coupon is embodied by a cookie that is provided from browser interface 125 to shopper 110 and that includes the details of the deal, or where the coupon is provided as a deal code that the purchaser enters when the decision is made to purchase the associated product. In another embodiment, the coupon is invisible to the purchaser, and is managed internally within e-commerce system 100. Here, browser interface 125 operates to determine an identity associated with shopper 110, such as an Internet Protocol (IP) address of the shopper, a login identification of the purchaser, or other information that serves to identify the shopper, the purchaser, or a session associated with the shopper or the purchaser. In a particular embodiment, purchasing traffic related to deals pages 134 are handled separately from normal purchasing traffic in shopping system 120. As such, a separate server or cloud computing node is assigned to handle the burst of purchasing traffic that is associated with deals pages 134. For example, deals that are set up to run on a Black-Friday or a Cyber Monday event can be routed to a dedicated server or cloud node to handle the rush of purchasing traffic.

Product details pages 136 represent content provided by e-commerce system 100 that is associated with the various products that are offered. For example, product details pages 136 can include technical specifications for the products, compatibility information for the products, functions and features of the products, comparisons between a particular product and other similar or related products, or other information that may be useful to the purchaser in determining whether or not to purchase a particular product. Candy aisle pages 138 represent content provided by e-commerce system 100 that is related to a particular product. Candy aisle pages 138 can include information on other products that enhance or compliment the functionality of a particular product. For example, where the particular product is a gaming related system, candy aisle pages 138 can provide information on gaming related products, such as multimedia monitors, gaming headsets, games, or the like. Candy aisle pages 138 can also include information on other products that are commonly purchased together with a particular product, such as information as to what other purchasers have selected in conjunction with the particular product. It will be understood that web pages 130 represents other web pages that provide various functions and features for shopping system 120, such as search pages, product family and product line pages, advertising content pages, support pages, or other web pages, as needed or desired.

Shopping applications 140 represent one or more programs or applications of shopping system 120 that manage the functions of the shopping system, and control the movement of the purchaser through the shopping system. In particular, shopping applications 140 operates to determine the particular products that the purchaser is shopping for, and to direct the shopping experience based upon the available web pages 130, the purchaser's browsing history, and other metrics, as needed or desired. Shopping applications 140 includes a coupon allocator 142, a shopping cart 144, and a waiting room 146. Coupon allocator 142, shopping cart 144, and waiting room 146 will be described below.

Secure purchasing system 150 represents one or more information handling systems, or a portion thereof, that are provided to permit the purchaser to execute a purchase on e-commerce system 100, to provide order information to the e-commerce system, including shipping and payment information, to review the order information, to commit the order, and the like. In a particular embodiment, secure purchasing system 150 provides a publicly accessible purchasing space that is not restricted as to the accessibility to the purchaser to purchase products. In another embodiment, secure purchasing system 120 represents a secure website that is restricted as to the accessibility to the purchaser to purchase products, and that may require the purchaser to provide authentication credentials in order to validate the purchaser's privilege to purchase products on the secure purchasing system. In addition, the communication between shopper 110 and browser interface 1525 are secured, such as communications via a HTTPS website. In a particular embodiment, secure purchasing system 150 represents a purchasing environment that is in compliance with a Payment Card Industry (PCI) Data Security Standard (DSS) that permits for secure on-line commerce between a purchaser and e-commerce system 100.

In a particular embodiment, secure purchasing system 150 is implemented on a separate information handling system from shopping system 120. In this way, a purchaser who is merely browsing, or is undecided as to whether or not to purchase a particular product, can perform shopping functions separately from the actual purchase functions. In particular, in order to provide secure purchasing system 150 in compliance with the PCI DSS, it may be necessary to segregate one or more purchasing function from other purchasing functions or from the shopping functions. For example, one or more purchasing function, such as the provision of credit card information or shipping address information, may need to be provided via a HTTPS web page, while other purchasing functions or the shopping functions may be provided via HTTP web pages. Here, the establishment of a separate information handling system for secure purchasing system 150 may simplify the configuration of browser interface 155, or may be needed to meet a regulatory requirement. As another example, where the shopping and purchasing traffic is expected to be very high, such as on high-sale dates like Black-Friday or Cyber-Monday, the shopping traffic can be effectively handled by a cloud-based structure for shopping system 120 that permits for regional distribution of the processing loads associated with the shopping traffic, while the actual purchasing traffic can be redirected to a central server data center that is controlled and maintained by the entity that provides e-commerce system 100. In another embodiment, shopping system 120 and secure processing system 150 are implemented on a common information handling system that is equipped with a virtualization-capable operating system, such as a virtual machine manager or a virtual machine hypervisor, and the shopping system is instantiated on the common information handling system on a virtual machine that is separate from a virtual machine instantiated on the common information handling system for the operation of the secure processing system. It will be understood that other structures where the functions of shopping system 120 and secure processing system 150 are implemented on a single information handling system, or are distributed over several information handling systems, as needed or desired.

Secure purchasing system 150 includes browser interface 155, web pages 160, and purchasing applications 170. Web pages 160 represent the content of secure purchasing system 150, as developed by the entity that provides e-commerce system 100, for the purpose of permitting the purchaser to execute a purchase on the e-commerce system, to provide order information to the e-commerce system, to review the order information, and to commit the order. As illustrated, web pages 160 includes a cart, check-out, and sign-in page 162, referred to hereinafter as cart page 162, a shipping information page 164, a payments page 166, and a review and confirmation page 168, referred to hereinafter as confirmation page 168. Cart page 162 represents a purchase summary page that lists the products that the purchaser wishes to purchase, and can include a price total, options for applying a discount or a coupon, and other check-out options. In a particular embodiment, cart page 162 includes a sign-in option. Here, the purchaser can have an account with the entity that provides e-commerce system 100, and can sign in to obtain other discounts or priority treatment that may not be available to purchasers without an account. It will be understood that the sign-in option can be provided on one or more of web pages 130 in shopping system 120, as needed or desired. In a particular embodiment, a coupon, as described above, can be applied to a product in cart page 162.

Shipping information page 164 represents a page on which the purchaser can enter information that relates to the location to which the purchaser wants the purchased products to be shipped. Payments page 166 represents a page on which the purchaser can enter information that relates to the method of payment for the purchased products. Confirmation page 176 represents a page that permits the purchaser the opportunity to review the details of the purchase, and provides a last chance to cancel the purchase of the products or to commit to the purchase.

Purchasing applications 170 represent one or more programs or applications of secure purchasing system 150 that manage the functions of the secure purchasing system, and control the movement of the purchaser through the secure purchasing system. In particular, purchasing applications 170 operates to direct the shopping experience based upon the available web pages 160, the purchaser's responses, and other metrics, as needed or desired. Purchasing applications 170 include a shopping cart 172, a coupon redeemer 174, and a purchase verifier 176. Shopping cart 172, coupon redeemer 174, and purchase verifier 176 will be described below.

Purchasing system monitor/manager 180 represents one or more information handling systems, or a portion thereof, that are provided to manage the flow and control the interactions between shopping system 120 and secure purchasing system 150. Purchasing system monitor/manager 180 includes a coupon manager 182 and a load manager 184. Coupon manager 182 operates to manage discount coupons in e-commerce system 100. In a particular embodiment, a coupon provides for a discounted price or other enhancement to the value of a particular product or group of products. A coupon can be provided that is limited in scope based upon time. For example, a coupon can be provided that is available during a particular time of day, day of the week, month of the year, or the like, during a particular span of time, such as until a certain date, or for an amount of time, or the like. A coupon can also be provided that is limited in scope based upon a quantity. For example, a limited number of a particular product may be available at a coupon price, and when that number of the product have been purchased, the coupon becomes invalid. A coupon can further provide an incentive to up-sell a product. For example, a base model of a product can be provided at a base price, and enhancements can be provided to the base model product at an additional price. Here, a coupon can be provided that discounts the additional price when one or more enhancements are purchased with the base model product.

Coupon manager 182 operates to manage the parameters associated with the coupons that are available on e-commerce system 100. The parameters can include the product or products that are covered by a particular coupon, a duration or time associated with the coupon, a quantity of the product to which the coupon applies, up-sell information for the product and other associated products, and other discount information, as needed or desired. Coupon manager 182 then provides the coupon information to coupon allocator 142, and the coupon allocator monitors the shopping activity of the purchaser. When the purchaser indicates an interest in a product that is the subject of a particular coupon, coupon allocator 142 provides the coupon to the purchaser.

In a particular embodiment, each coupon that is provided to a purchaser can include a unique identifier and can be authenticated to a particular purchaser. In a particular embodiment, in the cases where the scope of a coupon is limited, such as by time, coupon manager 182 operates to determine whether or not the scope of the limitation has been met, and to provide an indication to coupon redeemer 174 as to whether or not to honor a particular coupon based upon the determination. For example, where a coupon is limited as to time, coupon manager 182 can determine whether or not the coupon has expired, and can provide an indication to coupon redeemer 174 that the particular coupon is no longer valid. In another embodiment, in the cases where the scope of a coupon is limited, such as by quantity, coupon manager 182 provides the quantity information to coupon redeemer 174, and the coupon redeemer keeps a running count as to how many of the particular products have been sold through to purchase completion. Then, when a last product is purchased, coupon redeemer 174 provides an indication to coupon manager 182 that the last of the product has been sold, and the coupon manager 182 provides an indication to coupon allocator 142 that the last of the product has been sold, and the coupon allocator ceases providing additional coupons for that product. In another embodiment, coupon redeemer 174 provides coupon manager 182 with a running total of the number of products that have been purchased. Here, coupon manager 182 provides the running total to coupon allocator 142, and the coupon allocator operates with one or more of web pages 130 to provide an urgency indicator to the purchaser, such as a "X more at this price" indication. In the embodiments where the scope of a coupon is limited, coupon manager 182 can operate to modify one or more of web pages 130 to remove any indication of a deal for the particular product.

In the illustrated embodiment, a purchaser selects products to include in shopping cart 144. Then the information in shopping cart 144 is provided to shopping cart 172 in response to a decision by the purchaser to commit to purchasing a product. For example, a shopping cart page of web pages 130 can include a link to proceed to purchase the products represented on the shopping cart page, such as a check-out link. In a particular embodiment, when the purchaser activates the link, the contents of shopping cart 144 are provided to secure purchasing system 150, along with information related to shopper 110, the purchaser, or other information, as needed or desired, and the information is provided to shopping cart 172 for further processing, as described below.

Load manager 184 operates to determine a processing load on secure purchasing system 150 based upon the volume of purchasing traffic that is being processed by purchasing applications 170, and to throttle the purchasing traffic from shopping system 120 so as to manage the processing load on the secure purchasing system. For example, load manager 180 can operate to determine the processing load by monitoring the performance of an information handling system that instantiates secure processing system 150, such as by monitoring processor utilization, memory and storage utilization, network bandwidth utilization, or the like. In particular, load manager 184 can determine whether the processing load on secure purchasing system 150 is above or below a particular threshold. When the processing load is below the threshold, load manager 184 operates to permit purchasing transactions to be provided from shopping system 120 to secure purchasing system 150, and when the processing load is above the threshold, the load manager operates to throttle one or more purchasing transactions by holding purchasing transactions in the shopping system until a later time. In a particular embodiment, the one or more purchasing transactions are held in shopping system until such time that the processing load on secure purchasing system 150 falls below the threshold, and then load manager 184 permits more purchasing transactions to be passed to the secure processing system. In another embodiment, the one or more purchasing transactions are held for a particular length of time, or are permitted to be passed from shopping system 120 to secure processing system 150 at a limited rate. Here, further, load manager 184 can implement multiple thresholds, and can vary the rate at which purchasing transactions are permitted to be passed from shopping system 120 to secure processing system 150 based upon which threshold is exceeded, so that as the processing load on the secure processing system increases, the rate at which purchasing transactions are passed to the secure processing system is decreased.

When a purchaser has selected to proceed with purchasing a product, load manager 184 determines the processing load on secure processing system 150. If the processing load is low, load manager 184 provides a "not busy" indication to shopping applications 140, and the contents of shopping cart 144 are provided to shopping cart 172 for processing the purchase transaction. On the other hand, if the processing load is high, load manager 184 provides a "busy" indication to shopping applications 140, and the purchasing transaction is provide to waiting room 146 until such time as the load manager provides a "ready" indication which permits the purchasing transaction and the associated shopping cart to be provided to shopping cart 172 for processing the purchasing transaction. In a particular embodiment, waiting room 146 receives the contents of shopping cart 144, to hold until the associated purchasing transaction is permitted to pass to secure purchasing system 150, thereby freeing up the resources of the shopping cart for use by other purchasers. In another embodiment, waiting room 146 provides a queue for purchasing transactions, but the contents of shopping cart 144 remain in the shopping cart until they are passed to shopping cart 172.

Figure 2:
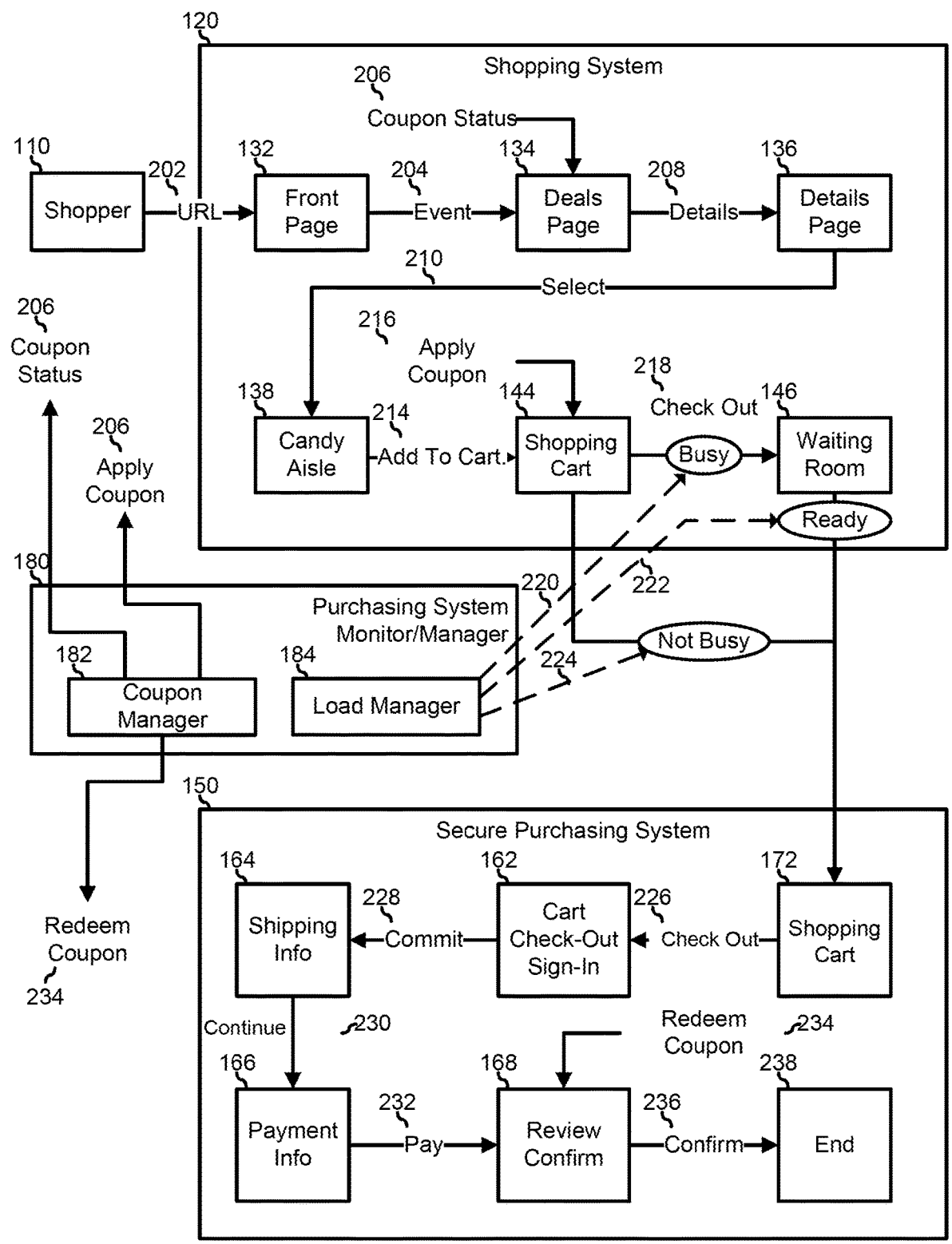
FIG. 2 is another diagrammatic view of the e-commerce system and showing a method of purchasing a product on the system.

FIG. 2 shows a method of purchasing a product on e-commerce system 100. A purchaser uses shopper 110 to enter a Uniform Resource Locator (URL) 202 that points to shopping system 120, and the shopping system provides front page 132 in response to receiving the URL. Front page 132 includes one or more links to a sale event, and the purchaser selects an event 204 that redirects the purchaser to deals page 134 that is associated with the selected event. Deals page 134 includes one or more links to a product that is being offered in the sale. The product is associated with a particular coupon that provides for a discounted price or other enhancement to the value of the product. Deals page 134 receives coupon status information 206 that defines the parameters of the coupon from coupon manager 182. Coupon status information 206 is generated by coupon manager 182 as described above. In particular, coupon status information 206 can be associated with the purchaser so that, as the purchaser navigates shopping system 120, the associated coupon remains available to the purchaser when the purchaser checks out from e-commerce system 100.

The purchaser selects to see the details 208 of a particular product on deals page 134 and the purchaser is redirected to details page 136. The purchaser selects a product 210 that redirects the purchaser to a candy aisle page 138 associated with the selected product. The purchaser can opt to add the selected product to the shopping cart 214, which redirects the purchaser to shopping cart page 144. In addition, from candy aisle page 138, the purchaser can also opt to select one or more items from the candy aisle page and add the selected options to shopping cart 144. At shopping cart 144, coupon manager 182 applies any available coupons to the products in the shopping cart. Here, one or more of coupon manager 182 and shopping applications 140 can perform an evaluation of the products in shopping cart 144, and can compare the results of the evaluation to the available coupons to determine if any coupons apply to the products in the shopping cart.

The activities as described above can be performed iteratively to add additional products to shopping cart 144. Then, when the purchaser is finished shopping, the purchaser selects a "check-out" option 218 from shopping cart 144. Here, when the purchaser selects the "check-out" option, load manager 184 determines the load on purchasing applications 170 to determine whether or not secure purchasing system 150 is busy, or is loaded over one or more load threshold. If purchasing applications 170 are busy, load manager 184 provides a "busy" indication 220, and the purchaser is moved into waiting room 146. Here, the actual product information from shopping cart 144 can be included in waiting room 146, or the purchaser can be queued into waiting room while the product information remains in the shopping cart, as described above. Then, when load manger 184 determines that purchasing applications 170 are not busy, or are loaded below one or more load threshold, the load manager provides a "ready" indication 222, and the contents of shopping cart 144 are moved into shopping cart 172 in secure purchasing system 160. Similarly, if load manager 184 determines that purchasing applications 170 are not busy, or are loaded below one or more load threshold, load manager 184 provides a "not busy" indication 224, and the contents of shopping cart 144 are moved into shopping cart 172 in secure purchasing system 150.

When a purchaser is redirected to waiting room 146, any coupons that are limited in scope can be frozen by coupon manager 182. For example, where a coupon is limited as to time, a purchaser may decide to purchase a product associated with the coupon within the time limit set by the coupon, but the time spent in waiting room 146 may push the actual execution of the purchase past the time limit set by the coupon. Here, coupon manager 182 can provide that the coupon is honored, even though nominally the coupon has expired. In a particular embodiment, coupon manager 182 can provide an override to the coupon that overrides a time associated with the purchase, so that when the purchase is completed, the coupon is honored. In another embodiment, coupon manager 182 can provide a time stamp that indicates when the coupon is requested, and the application of the coupon can be based on the time stamp, rather than upon the time when the purchase is completed.

After the purchaser opts to check-out 218 and the contents of shopping cart 144 are moved to shopping cart 172, secure purchasing system 150 displays cart page 162 to indicate that the purchase is set to proceed. Here, the purchaser can be provided with the opportunity to sign-in to an to an account with the entity that provides e-commerce system 100 to obtain other discounts or priority treatment that may not be available to purchasers without an account. When the purchaser opts to commit to the purchase of the products 228 in shopping cart 172, the purchaser is forwarded to shipping information page 164 to enter a location to which the purchaser wants the products to be shipped. The purchaser opts to continue 230 after entering the shipping information, and is redirected to payment information page 166 to enter information as to how the purchaser wishes to pay for the products. The purchaser opts to pay 232 for the products 232 after entering the payment information, and is redirected to confirmation page 168 where the purchaser can make a last review of the purchase details. Here, when the purchaser confirms 236 the purchase, coupon manager 182 redeems the coupon 234 and the purchase ends 238.

Figure 3:
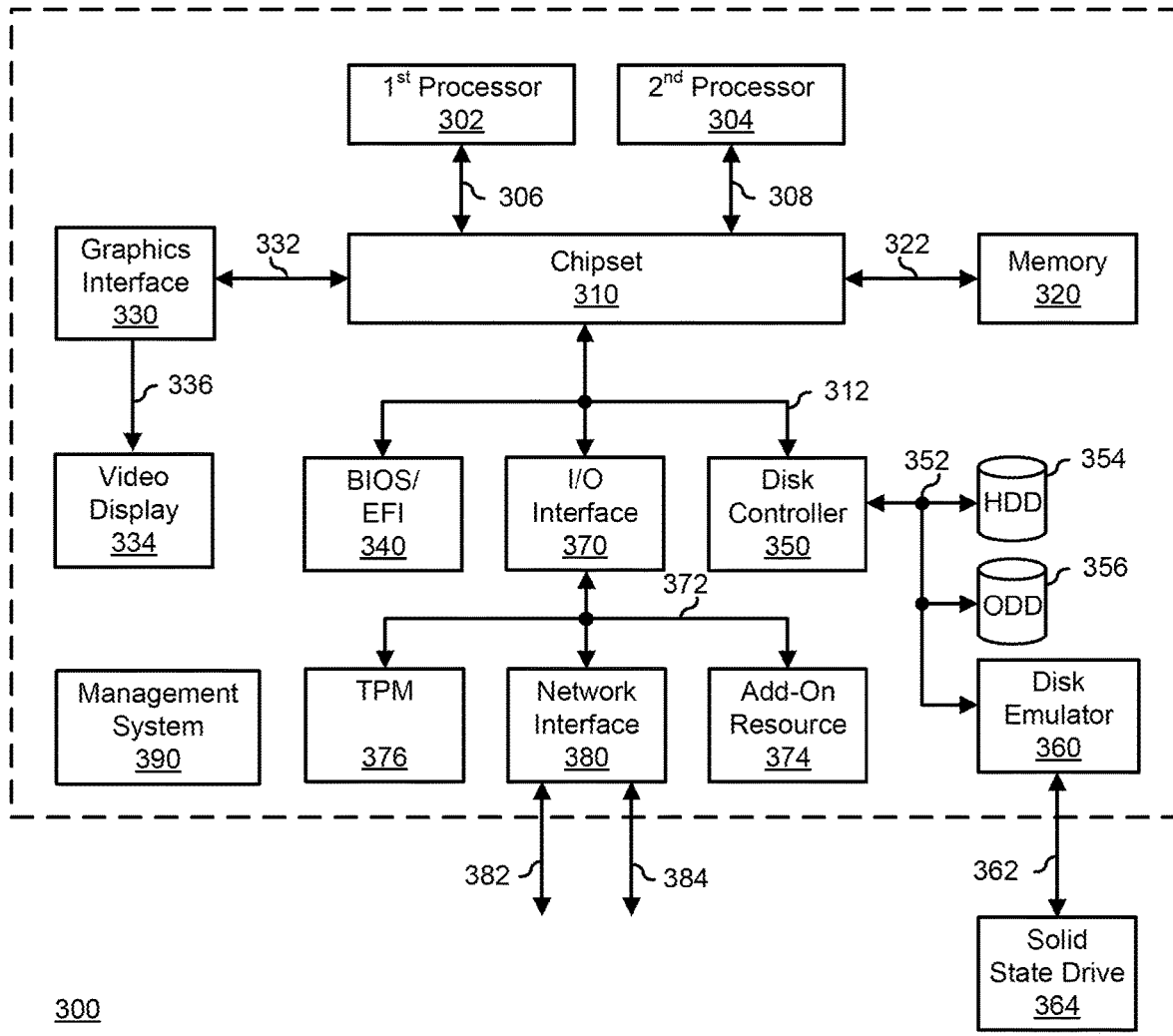
FIG. 3 is a block diagram illustrating a generalized information handling system according to an embodiment of the present disclosure.

FIG. 3 shows an information handling system 300 that can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, a network interface 380, and a management system 390. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management controller 390 provides for out-of-band monitoring, management, and control of the respective elements of information handling system 300, such as cooling fan speed control, power supply management, hot-swap and hot-plug management, firmware management and update management for system BIOS or UEFI, Option ROM, device firmware, and the like, or other system management and control functions as needed or desired. As such, management system 390 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a first processor that provides a shopping system including:
a deal webpage that displays a coupon associated with a product, the coupon including a deal code, wherein the deal webpage receives a request to purchase the product from a purchaser, the request including the deal code, wherein the coupon provides a deal to the purchaser for the purchase of the product, wherein the first processor provides a cookie including details of the deal to the purchaser, and wherein the coupon is provided based upon a limit;
a coupon allocator that determines whether or not the limit is exceeded, and that allocates the coupon to the purchaser in response to the request, and in further response to determining that the limit is not exceeded;
a first shopping cart to receive the request; and
a waiting room;
a second processor that provides a purchasing system including:
a second shopping cart to receive the request in response to a decision by the purchaser to commit to purchasing the product;
a purchase webpage that displays a purchase of the product by the purchaser in response to the decision; and
a coupon redeemer that redeems the coupon for the product in further response to determining that the limit is not exceeded; and
a third processor that provides a management system including a coupon manager and a load manager, wherein the coupon manager modifies the limit based upon the number of coupons for the product that have been redeemed and modifies the deal webpage to remove the display of the coupon from the deal webpage when the limit is exceeded, and wherein the load manager determines whether a processing load on the second processor is greater than a threshold, provides a first indication to the first processor to send the request from the first shopping cart to the second shopping cart in response to the decision when the processing load is not greater than the threshold, and provides a second indication to the first processor to send the request and the coupon to the waiting room in response to the decision when the processing load is greater than the threshold;
wherein the coupon manager further:

determines that the request is held in the waiting room during the time which the coupons for the product are available;

determines that the purchase of the product occurs after the time which the coupons for the product are available; and directs the coupon redeemer to redeem the coupon for the product when the request is held in the waiting room during the time which the coupons for the product are available and when the purchase of the product occurs after the time which the coupons for the product are available;

wherein the first processor sends the request from the first shopping cart to the second shopping cart in response to the first indication, and sends the request from the first shopping cart to the waiting room in response to the second indication.

2. The information handling system of claim 1, wherein: the coupon allocator makes a determination that a first number of the coupons for the product that have been allocated is less than the pre-determined quantity.

3. The information handling system of claim 2, wherein allocating the coupon to the purchaser is in further response to the determination.

4. The information handling system of claim 1, wherein: the coupon redeemer determines a number of coupons for the product that have been redeemed.

5. The information handling system of claim 1, wherein the limit defines a time during which the coupons for the product that are available.

6. A method comprising:

displaying, by a shopping system instantiated on a first processor, a deal webpage that includes a coupon associated with a product, the coupon including a deal code, wherein the coupon provides a deal to a purchaser for the purchase of the product, and wherein the coupon is provided based upon a limit; receiving, by the shopping system, a request to purchase the product from the purchaser, the request including the deal code;

providing, by the shopping system, a cookie including details of the deal to the purchaser;

determining, by a coupon allocator of the shopping system, whether or not the limit is exceeded;

allocating, by the coupon allocator, the coupon to the purchaser in response to the request, and in further response to determining that the limit is not exceeded;

displaying, by a purchasing system instantiated on a second processor, a purchase webpage that displays a purchase of the product by the purchaser in response to the request;

sending, by the first processor, the request to a first shopping cart of the shopping system;

redeeming, by a coupon redeemer of the purchasing system, the coupon for the product in response to determining that the limit is not exceeded;

modifying, by a coupon manager of a management system instantiated on a third processor, the limit based upon the number of coupons for the product that have been redeemed;

modifying, by the coupon manager, the deal webpage to remove the display of the coupon from the deal webpage when the limit is exceeded;

determining, by a load manager instantiated on the third processor, whether a processing load on the second processor is greater than a threshold;

providing, by the load manager, a first indication to the first processor to send the request from the first shopping cart to a second shopping cart of the purchasing system when the processing load is not greater than the threshold;

sending, by the first processor, the request from the first shopping cart to the second shopping cart in response to the first indication;

providing, by the load manager, a second indication to the first processor to send the request to a waiting room of the shopping system when the processing load is greater than the threshold;

sending, by the first processor, the request from the first shopping cart to the waiting room in response to the second indication;

determining, by the coupon manager, that the request is held in the waiting room during the time which the coupons for the product are available;

determining, by the coupon manager, that the purchase of the product occurs after the time which the coupons for the product are available; and directing, by the coupon manager, the coupon redeemer to redeem the coupon for the product when the request is held in the waiting room during the time which the coupons for the product are available and when the purchase of the product occurs after the time which the coupons for the product are available.

7. The method of claim 6, wherein the limit defines a pre-determined quantity of coupons for the product that are available for purchase with the coupon.

8. The method of claim 7, further comprising:

determining that a first number of the coupons for the product that have been allocated is less than the pre-determined quantity.

9. The method of claim 8, wherein allocating the coupon to the purchaser is in further response to determining that the first number of the coupons for the product that have been allocated is less than the pre-determined quantity.

10. The method of claim 7, further comprising:

determining a number of coupons for the product that have been redeemed.

11. The method of claim 6, wherein the limit defines a time during which the coupons for the product that are available.

12. A non-transitory computer-readable medium including code for performing a method, the method comprising:

displaying, by a shopping system instantiated on a first processor, a deal webpage that includes a coupon associated with a product, the coupon including a deal code, wherein the coupon provides a deal to a purchaser for the purchase of the product, and wherein the coupon is provided based upon a limit;

receiving, by the shopping system, a request to purchase the product from the purchaser, the request including the deal code;

providing, by the shopping system, a cookie including details of the deal to the purchaser;

determining, by a coupon allocator of the shopping system, whether the limit is exceeded;

allocating, by the coupon allocator, the coupon to the purchaser in response to the request, and in further response to determining that the limit is not exceeded;

displaying, by a purchasing system instantiated on a second processor, a purchase webpage that displays a purchase of the product by the purchaser in response to the request;

sending, by the first processor, the request to a first shopping cart of the shopping system;

redeeming, by a coupon redeemer of the purchasing system, the coupon for the product in response to determining that the limit is not exceeded;

modifying, by coupon manager of a management system instantiated on a third processor, the limit based upon the number of coupons for the product that have been redeemed;

modifying, by the coupon manager, the deal webpage to remove the display of the coupon from the deal webpage when the limit is exceeded;

determining, by a load manager instantiated on the third processor, whether a processing load on the second processor is greater than a threshold;

providing, by the load manager, a first indication to the first processor to send the request from the first shopping cart to a second shopping cart of the purchasing system when the processing load is not greater than the threshold;

sending, by the first processor, the request from the first shopping cart to the second shopping cart in response to the first indication;

providing, by the load manager, a second indication to the first processor to send the request to a waiting room of the shopping system when the processing load is greater than the threshold;

sending, by the first processor, the request from the first shopping cart to the waiting room in response to the second indication;

determining, by the coupon manager, that the request is held in the waiting room during the time which the coupons for the product are available;

determining, by the coupon manager, that the purchase of the product occurs after the time which the coupons for the product are available; and directing, by the coupon manager, the coupon redeemer to redeem the coupon for the product when the request is held in the waiting room during the time which the coupons for the product are available and when the purchase of the product occurs after the time which the coupons for the product are available.

13. The computer-readable medium of claim 12, wherein:
the limit defines a pre-determined quantity of coupons for the product that are available for purchase with the coupon;
the method further comprises determining that a first number of the coupons for the product that have been allocated is less than the pre-determined quantity; and
allocating the coupon to the purchaser is in further response to determining that the first number of the coupons for the product that have been allocated is less than the pre-determined quantity.

14. The computer-readable medium of claim 12, wherein the limit defines a time during which the coupons for the product that are available.

15. The information handling system of claim 1, wherein, after providing the second indication, the load manager further provides a third indication to the first processor to send the request from the waiting room to the second shopping cart in response to the decision when the processing load is not greater than the threshold.

16. The method of claim 6, wherein, after providing the second indication, the method further comprises:
providing, by the load manager, a third indication to the first processor to send the request from the waiting room to the second shopping cart when the processing load is not greater than the threshold; and
sending, by the first processor, the request from the waiting room to the second shopping cart in response to the third indication.

* * * * *